United States Patent Office 3,099,293
Patented July 30, 1963

3,099,293
REINFORCED PLASTIC FROM AN OPEN CURE TECHNIQUE WITH A GRAFT POLYMER
Julian Lakritz, Rahway, and Richard G. Adams, Montclair, N.J., assignors to Esso Research and Engineering Company, a corporation of Delaware
No Drawing. Filed Oct. 28, 1959, Ser. No. 849,145
19 Claims. (Cl. 138—141)

This invention relates to a method for providing an open flash technique to obtain a reinforced plastic, and more particularly it is concerned with a graft polymer and the improved laminate therefrom.

It is known to prepare a resin by subjecting a resinifiable mix with a curable liquid polydiolefin therein to a continuous cure at elevated temperatures. Furthermore, it is also known to laminate the resinifiable mix with a reinforcing element to provide a hard, solid, reinforced plastic therefrom.

In the past, it has also been possible to prepare a B-stage product and/or a final product by providing a graft polymer (pre-B-stage material) from a resinifiable mix. Additional monomers have been incorporated in the graft polymer in conjunction with a closed mold technique to form a B-stage or final cure depending upon the temperature and time conditions which were employed. However, this graft polymer, when cured in an open mold, gives a laminate of limited strength and hardness. While this may be satisfactory for some applications, stronger and harder materials are often desired.

It has now been discovered that a paper or cloth laminate of superior strength and hardness can be prepared in an open mold by including a difunctional monomer in the original resinifiable mix. Thus in accordance with one embodiment of this invention, a mix is prepared comprising a curable polydiolefin; a crosslinking system, e.g., vinyl toluene; a free radical forming catalyst; and a difunctional monomer, such as divinyl benzene. This mix is then reacted in solution at elevated temperatures to form a graft polymer. A reinforcing element such as paper and/or cloth can be impregnated with this graft polymer and dried with solvent removal in an air circulating oven at elevated temperatures. This material has the advantage of containing no volatile material, e.g. monomeric vinyl crosslinking agents and can therefore be laminated in an open mold at temperatures considerably above the boiling point of commonly used crosslinking agents, e.g. vinyl toluene, styrene. The use of higher temperatures gives faster cure rates which makes the process commercially feasible.

Furthermore, the inclusion of difunctional monomer in the graft polymer results in a product of higher strength than was heretofore obtainable. This dried prepreg therefrom can then be laminated with similar items by an open flash technique to provide an improved laminate therefrom.

The preferred polymeric oils included in the resinifiable mix in this invention are prepared from diolefins, particularly those which are conjugated and have 4 to 6 carbon atoms per molecule, such as butadiene, hexadiene, isoprene, dimethyl butadiene, piperylene, and methyl pentadiene. Diolefins may be used which are copolymerized with minor amounts of ethylenically unsaturated monomers as styrene, acrylonitrile, methyl vinyl ketone, or with styrenes having alkyl groups substituted on the ring, e.g., paramethyl styrene, dimethyl styrene, etc. A preferred diolefin polymeric oil is one prepared by reacting 75 to 100 parts of butadiene and 25 to 0 parts of styrene in the presence of metallic sodium catalyst. This, therefore, includes the homopolymer of butadiene and the copolymer of butadiene with styrene. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane-1,4 and diethyl ether. Finally, it is beneficial to use about 5 to 35 weight percent, based on sodium, of an alcohol such as methanol, isopropanol, or an amyl alcohol in order to overcome the initial induction period. The resulting product may vary in viscosity from 0.15 to 20 poises. The preparation of this oil in the presence of an alkali metal or peroxide catalyst is described in U.S. Patents 2,762,851 and 2,586,594, which are incorporated herein by reference.

Besides the curable polydiolefin heretofore described, this resinifiable mix generally comprises an aryl monomer containing at least 2 vinyl radicals attached to the aryl nucleus, a monovinyl crosslinking agent, and a peroxide catalyst. Crosslinking agents may be added to the curable polydiolefin oil to impart an effective crosslinking of the resin. Such agents comprise the following compounds: vinyl aromatics such as styrene and vinyl toluene; halo-styrenes; vinylnaphthalenes; alkyl acrylates; methacrylates; alkyl fumarates, e.g., diethyl fumarate; and allyl esters, acrylonitrile; vinyl chloride; and vinylidene chloride. Preferred compounds are vinyl toluene, and styrene. The crosslinking agent is generally included within the range of 0 to 75% of the curable liquid mix, preferably 30 to 60%.

A catalyst is also incorporated in the resinifiable mix within the range of 0.2 to 10 parts, preferably 0.5 to 5 parts. The catalyst is advantageously a free radical or peroxide type such as dialkyl or aralkyl peroxides, e.g., dicumyl peroxide and ditertiary butyl peroxide; and alkyl perester peroxides, e.g., ditertiary butyl diperphthalate and tertiary butyl perbenzoate. Dicumyl peroxide and ditertiary butyl peroxide are preferred; benzoyl peroxide and other low temperature azo- and hydro-peroxides may also be employed in the mix. It may also be advantageous to incorporate 0.02 to 0.5 weight percent of antioxidant in the mix after graft polymerization, e.g., t-butyl hydroquinone, hydroquinone t-butyl catechol and 2,6-di-t-butyl-p-cresol. These compounds provide excellent storage stability by destroying the residual peroxide catalyst after the curing procedures.

In accordance with this invention, a difunctional compound, e.g., a polyvinyl compound, is included in the aforementioned mix. The polyvinyl compounds within the purview of this invention are those which have the general structure as indicated herebelow:

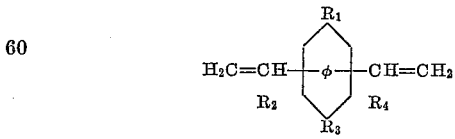

wherein $R_1$, $R_2$, $R_3$, and $R_4$ attached to the ring are each independently selected from the group consisting of hydrogen, halogens, alkyl groups containing up to 4 carbon atoms, and a vinyl group; and $\phi$ is an aromatic nucleus such as benzene, naphthalene, biphenyl, and phenanthrene. Specific examples are divinyl benzene, divinyl tolune, divinylxylene, divinylnaphthalene, and trivinyl benzene. The especially preferred compound is divinyl benzene. This compound is employed within a range of 0.5 to 20 parts per 100 parts by weight of total reactive mix (phm.), preferably 1 to 5 parts. Other difunctional compounds which may be applicable are ethylene glycol, dimethacrylate, and the like.

In accordance with this invention, the resinifiable mix with the above compounds therein is reacted to form a graft polymer by heating at a temperature between 200° and 300° F., preferably 240° and 275° F. for 15 to 320 minutes. The graft polymer is not the same as a B-stage partial cure and/or a complete cure. The graft polymer has only two dimensional crosslinking whereas the B-stage has three dimensional crosslinking. Furthermore, the graft polymer is soluble in hydrocarbon solvents, e.g., toluene, xylene, close-cut naphthas, and Varsol; in contrast, the B-stage is not soluble in these compounds. The comparison of properties of the three stages are demonstrated herebelow.

| Graft Polymer | B-Stage | Complete Cure |
| --- | --- | --- |
| Soluble in Solvents. Viscosity between 2 and 12 poise at 50% NVM. | Soft gel, swells in solvents and therefore not soluble in solvents. | Hard solid, affected very slightly by, or inert to, solvents. |

Different time and temperature conditions are required to provide each type of cure. For example, if a typical mix is heated to 265° F. for 60 minutes, a graft polymer may be formed; if the temperature is 325° F. and time is 30 minutes, a B-stage product may be provided; if 360° F. for 20 minutes are the conditions employed, a complete cure may result therefrom. Each of these stages of cure may be reached by curing at higher temperatures using shorter times. However, for making a graft polymer, a lower temperature (longer time cycle) gives better control of the product.

In order to get a high degree of combination of crosslinking agent, the reaction is run in excess monofunctional monomer, e.g., vinyl toluene. However, it is important to limit the amount of difunctional monomer so as to minimize the formation of three dimensional crosslinks. The formation of three dimensional crosslinks is further suppressed by carrying out the reaction in an inert solvent solution, e.g., toluene. After the reaction is complete, the volatile materials can be removed under vacuum and, if desired, replacd by a different solvent and/or monomer. The graft polymer can be stabilized by the addition of inhibitor. A similar process can be run with other crosslinking agents such as vinyl chloride, vinylidene chloride, styrene, etc.

The reinforcing elements that are applicable to this invention includes such items as mineral materials, e.g., glass, asbestos, mica, rock, and celite; vegetable materials, e.g., cotton, linen, rayon, paper, sisal, and silk; organic materials, e.g., hair, nylon, and Orlon; and metallic materials, e.g., iron, aluminum, and copper. Reinforcing elements may comprise 80% by weight of the reinforced plastic, preferably 35 to 80%. However, the preferred materials are paper, glass fiber and cloth. In accordance with this invention, glass fiber is defined as any fibrous glass unit to include filament yarns, rovings, reinforcing mats, staple yarns, woven fabrics, and milled fibers. A protective size may be applied to glass fibers. Examples of sizes which can be used are as follows: starch-mineral oil mixtures; polyvinyl acetate; polyisobutylene; copolymers of isobutylene with isoprene; and copolymers of butadiene with styrene. It is within the scope of this invention to use glass fiber which has been treated with an unsaturatd organic halo silane, having the formula $R_nSiX_{4-n}$, wherein R is vinyl or allyl group, $n$ is a positive integer equal to 1, 2 or 3, and X is halogen. It is also possible to incorporate 0.1 to 5 parts of a silane ester in the resinifiable mix which has the general formula $R_nSi(OR_1)_{4-n}$, wherein R is an unsaturated group, e.g., vinyl, allyl, methallyl, or crotyl group; $n$ is a positive integer equal to 1, 2, or 3; and $R_1$ is an alkyl or aryl group or substitutes thereof. It is believed that the above-described silanes react with the hydroxyl groups in the glass. The unsaturated or vinyl portion of the molecule, bound to the glass through the silicon atom, reacts with the polymer during the curing step, thus effectively bonding the curable polymer and the glass fiber.

The reinforcing agent can be laminated as per the instant invention with the resinifiable polymer mix which has been cured to a graft polymer. A laminate, according to this invention, is defined as a composite mass of a reinforcing element and a thermosetting resin. This, therefore, includes layers of paper and resin; cloth embedded in a resin; and fibers saturated with resin and formed in a hollow cylindrical pipe. Accordingly, impregnation can be accomplished by any known method. For example, the graft polymer can be combined with paper by brush impregnation; by being poured into the center of several piles of paper assembled on cellophane-covered glass plate; and by dipping the paper into the graft polymer.

In accordance with the preferred open mold technique of the present invention, the reinforcing element, e.g., paper and/or glass cloth, is impregnated with the graft polymer and dried in an air circulating oven at a temperature of room temperature to 325° F. for 30 seconds to 2 hours. A prepreg is obtained therefrom which is not tacky and is adaptable for being laminated in an open mold to provide a reinforced plastic therefrom. Depending upon the conditions employed this prepreg can be a dried graft polymer, e.g., with a temperature of 250° F. and below, or a B-stage product, e.g., with a temperature above 250° F. may be formed.

Accordingly, this prepreg is then laminated with similar items. Thus, one method used in the manufacture of solid rectangular sheets is to form layers of the reinforcing element, e.g. paper with the partially cured mix thereon. After the desired thickness is obtained, the sheet is cured to a unitary reinforced plastic. Another method can be used for the manufacture of cylindrical hollow pipes. Glass fibers, with the polymeric mix partially cured thereon, can be wound about a steel mandrel. This can be accomplished by any method. In one method, the fiber rovings, e.g., glass fibers, are wound at an angle to the axis of the mandrel circumferentially in superimposed layers to form a peripheral shell of the pipe. After the desired shape is obtained the wrapping can be cured to form the unitary rigid pipe.

In a commercial operation, the paper and/or cloth can be impregnated by passing it through a bath of the graft polymer. Any solvent therein can then be evaporated by air drying at elevated temperatures, and the sheet can be cut to size and stacked in bundles. These bundles are then placed in a hydraulic press between steam-heated platens and cured under heat and pressure. Standard sheets can be as large as 30" x 110" and may commercially range in thicknesses from 1/64" up to 2". Sheets can be cut and punched and various shapes can be produced by this method.

The laminated items are subsequently subjected to a final cure to provide a hard, solid reinforced plastic. This can be accomplished in an open flash technique (open mold) by employing a temperature between 280° and 450° F. for between 30 seconds and 2 hours with a pressure between 0 and 5000 p.s.i. Open mold curing is entirely different from a closed mold technique. In an open mold, the material is not contained therein, for example, in an open flash technique the retaining sides are absent from the molding device. In contrast, a closed mold completely contains the material being cured.

Thus in accordance with this invention it is now possible to provide a reinforced plastic with superior strength from a graft polymer by employing an open mold technique.

The following examples are submitted to illustrate and not to limit this invention:

EXAMPLE I

A polymeric oil was provided from the compounds indicated herebelow:

| | Parts |
|---|---|
| Butadiene-1,3 | 100 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene–100 K.B. value, n-heptane 25.4 K.B. value).
[2] Dispersed to a particle size of 10 to 50 microns by means of an Eppenbach homo-mixer.

The polymerization was performed at 50° C. in a 2-liter autoclave equipped with a mechanical agitator. Complete conversion was obtained in 4.5 hours. The catalyst was destroyed and removed from the resulting crude product. Essentially all of the solvent was removed by stripping to give a product of essentially 100% NVM. The resulting product had a viscosity of 1.5 poises at 50% NVM in Varsol solution and the nonvolatile portion thereof had an average molecular weight of about 8,000.

A resinifiable mix was prepared with 350 grams of the above polybutadiene and 500 grams of toluene. This mix was heated to 114° C., and within the course of 13 minutes a solution of 150 grams of vinyl toluene, 10 grams of divinyl benzene (50 to 60%), and 2.5 grams of benzoyl peroxide were incorporated therein. The reaction temperature was increased to 118.5° C. and was maintained at this level for 95 minutes. The viscosity increased from 0.32 to 1.48 poises at 25° C.

One hundred parts of the above graft polymer were combined with 2 parts of dicumyl peroxide and 0.25 part of A–172 (vinyl silane). A sheet of cotton linter paper was impregnated with this graft polymer mix and dried in an air circulating oven for 5 minutes at 250° F. A tack-free product was obtained therefrom. Eighteen plies of this impregnated paper were laminated by an open flash technique at 1800 p.s.i. at 325° F. for one hour. The laminate therefrom had a flexural strength of 20,600 p.s.i. at room temperautre and a flexural strength of 15,800 p.s.i. at 160° F.

A similar mix was prepared without divinyl benzene therein by heating 300 grams of polybutadiene, 200 grams of vinyl toluene, 200 grams of toluene, and 5 grams of benzoyl peroxide at 128 to 135° C. for 48 minutes. The viscosity increased to a value of 17.6 poises measured at 25° C. Two parts of dicumyl peroxide were added to this mix and a sheet of cotton linter paper was impregnated with this final mix and dried in an air circulating oven for 5 minutes at 250° F. Eighteen plies of the end product were combined and subjected to 1,000 p.s.i. at 330° F. for one hour. The laminate therefrom was not hard enough to provide a satisfactory flexural strength measurement.

EXAMPLE II

A resinifiable mix, e.g., polybutadiene, vinyl toluene, and divinyl benzene was reacted in a batch reactor to form a graft polymer. The reaction was carried out at relatively short residence time, at high temperature, and at a high catalyst concentration with peroxides as the catalyst. The temperature was chosen so that the peroxide had a half life of less than 5 minutes. The quantity of catalyst was chosen so that sufficient combination of the monomers occurred without excessive bodying. With the above three monomers a reaction temperature of 115° C., 30 minutes reaction time, and 0.5 wt. percent benzoyl peroxide (based on monomers) produced an excellent product suitable for use in open flash molding of high pressure laminates. To improve the usefulness of the product, vacuum stripping can be used to increase the solids content of the polymer solution. Table I presents data on the preparation and testing of product which provides a high degree of combination of the reactants without excessive bodying of the polybutadiene per se.

Table I
EVALUATION OF GRAFT POLYMER (a)

| Catalyst Concentration [a] | 0.1 | | 0.5 | |
|---|---|---|---|---|
| Reactor Temperature, ° C. | 105 | 115 | 105 | 115 |
| Flexural Strength @ Room Temperature, p.s.i. | | | | |
| Product Viscosity, poise :[b] | | | | |
| 0.1 | 19,800 | 21,300 | 19,900 | 21,300 |
| 0.3 | 16,700 | 22,000 | 19,100 | 21,900 |
| Flexural Strength @ 160° F., p.s.i. | | | | |
| 0.1 | 13,700 | 15,700 | 13,500 | 17,200 |
| 0.3 | 10,200 | 15,300 | 13,500 | 16,500 |
| Flexural Strength Retained @ 160° F., percent | | | | |
| 0.1 | 69 | 74 | 68 | 81 |
| 0.3 | 61 | 70 | 71 | 75 |
| Product Clarity (0=clear; 1=almost clear; 2=sl. cldy.; 2=cldy.; 4=v. cldy.) | | | | |
| 0.1 | 0 | 1 | 0 | 0 |
| 0.3 | 3 | 2 | 1 | 0 |
| Flow in Mold (0=No flow; 1=some; 2=considerable) | | | | |
| 0.1 | 2 | 2 | 2 | 2 |
| 0.3 | 2 | 2 | 1 | 2 |
| Extent of Reaction, Increase in Percent Solids | | | | |
| 0.1 | 4.5 | 5.4 | 5.9 | 8.7 |
| 0.3 | 6.2 | 9.6 | 9.3 | 10.2 |

[a] Feed: 50 parts close cut naphtha as diluent, 30 parts polybutadiene, 20 parts vinyl toluene, 2 parts divinyl benzene; catalyst-benzoyl peroxide added as wt. percent on reactants.
[b] Gardner Standards used to determine viscosity.

Having set forth the general nature and embodiments of the present invention, the true scope is particularly pointed out in the appended claims.

What is claimed is:

1. A process which comprises preparing a resinifiable mix comprising an inert solvent solution containing between about 30 and about 60 wt. percent of a monovinyl crosslinking agent, between about 0.5 and about 5 wt. percent of a free radical organic peroxide catalyst, between about 0.5 and about 20 wt. percent of an aryl monomer containing at least two vinyl radicals attached to the aryl nucleus and the balance of said mix being a a normally liquid polymer of a $C_4$ to $C_6$ conjugated diolefin, heating said mix to a temperature between about 200 and about 300° F. for between about 320 and about 15 minutes to form a graft polymer, impregnating fibrous reinforcing elements with said graft polymer, and air drying said impregnated fibrous reinforcing elements to form a prepreg product.

2. A process as in claim 1 wherein a plurality of prepreg products are laminated in an open mold and cured.

3. A process as in claim 1 wherein the monovinyl crosslinking agent is vinyl toluene, the aryl monomer is divinyl benzene, the peroxide catalyst is benzoyl peroxide, the normally liquid polymer is the copolymer of butadiene and styrene and the fibrous reinforcing elements are paper and wherein a plurality of prepreg products are laminated in an open mold and cured.

4. A process which comprises preparing a resinifiable mix comprising an inert solvent solution containing between about 30 and about 60 wt. percent of a monovinyl crosslinking agent, between about 0.5 and about 20 wt. percent of an aryl monomer containing at least two vinyl radicals attached to the aryl nucleus, between about 0.5 and about 5.0 wt. percent of a free radical organic peroxide catalyst and the balance of said mix being a normally liquid polymer of a $C_4$ to $C_6$ conjugated diolefin and heating said mix at a temperature between about 200 and about 300° F. for between about 320 and about 15 minutes to form a graft polymer.

5. A process as in claim 4 wherein the normally liquid polymer is selected from the group consisting of the homopolymer of butadiene and the copolymer of butadiene with styrene.

6. A process as in claim 4 wherein the aryl monomer is a vinyl compound having the formula

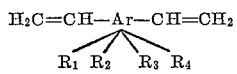

wherein $R_1$, $R_2$, $R_3$ and $R_4$ are selected from the group consisting of hydrogen, halogen, alkyl containing up to four carbon atoms per radical and vinyl, and Ar is selected from the group consisting of benzene, naphthalene, biphenyl and phenanthrene.

7. A process as in claim 4 wherein the monovinyl crosslinking agent is vinyl toluene, the aryl monomer is divinyl benzene, the peroxide catalyst is benzoyl peroxide, and the normally liquid polymer is the copolymer of butadiene with styrene.

8. A graft polymer produced from a resinifiable mix comprising an inert solvent solution containing between about 30 and about 60 wt. percent of a monovinyl crosslinking agent, between about 0.5 and about 20 wt. percent of an aryl monomer containing at least two vinyl radicals attached to the aryl nucleus, between about 0.5 and about 5.0 wt. percent of a free radical organic peroxide catalyst and the balance of said mix being a normally liquid polymer of a $C_4$ to $C_6$ conjugated diolefin, said mix having been cured at between about 200 and about 300° F. for between about 320 and about 15 minutes to form said graft polymer.

9. A graft polymer as in claim 8 wherein the normally liquid polymer is selected from the group consisting of the homopolymer of butadiene and the copolymer of butadiene and styrene.

10. A graft polymer as in claim 8 wherein the aryl monomer is a vinyl compound having the formula

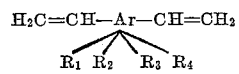

wherein $R_1$, $R_2$, $R_3$, and $R_4$ are selected from the group consisting of hydrogen, halogen, alkyl containing up to four carbon atoms per radical and vinyl, and Ar is selected from the group consisting of benzene, naphthalene, biphenyl and phenanthrene.

11. A prepreg comprising fibrous reinforcing elements impregnated with a graft polymer prepared from a resinifiable mix comprising an inert solvent solution containing between about 30 and about 60 wt. percent of a monovinyl crosslinking agent, between about 0.5 and about 20 wt. percent of an aryl monomer containing at least two vinyl radicals attached to the aryl nucleus, between about 0.5 and about 5.0 wt. percent of a free radical organic peroxide catalyst and the balance of said mix being a normally liquid polymer of a $C_4$ to $C_6$ conjugated diolefin, said mix then being heated to between about 200 and about 300° F. for between about 320 and about 15 minutes to form a graft polymer which in turn is impregnated into said fibrous reinforcing elements and heated in the presence of additional peroxide catalyst at a superatmospheric temperature to form the prepreg.

12. A prepreg as in claim 11 wherein the normally liquid polymer of the resinifiable mix is selected from the group consisting of the homopolymer of polybutadiene and the copolymer of butadiene with styrene.

13. A prepreg as in claim 11 wherein the aryl monomer of the resinifiable mix is a vinyl compound having the formula

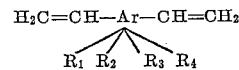

wherein $R_1$, $R_2$, $R_3$, and $R_4$ are selected from the group consisting of hydrogen, halogen, alkyl containing up to four carbon atoms per radical and vinyl, and Ar is selected from the group consisting of benzene, naphthalene, biphenyl and phenanthrene.

14. A graft polymer prepared from a resinifiable mix comprising an inert solvent solution containing between about 30 and about 60 wt. percent of a monovinyl crosslinking agent, between about 0.5 and about 20 wt. percent of an aryl monomer containing at least two vinyl radicals attached to the aryl nucleus, between about 0.5 and about 5.0 wt. percent of a free radical organic peroxide catalyst and the balance of said mix being a normally liquid polymer of a $C_4$ to $C_6$ conjugated diolefin, heating said mix at a temperature between about 200 and about 300° F. for between about 320 and 15 minutes to form a graft polymer.

15. A graft polymer as in claim 14 wherein the normally liquid polymer of the resinifiable mix is selected from the group consisting of the homopolymer of polybutadiene and the copolymer of butadiene with styrene.

16. A graft polymer as in claim 14 wherein the aryl monomer of the resinifiable mix is a vinyl compound having the formula

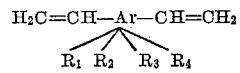

wherein $R_1$, $R_2$, $R_3$, and $R_4$ are selected from the group consisting of hydrogen, halogen, alkyl containing up to four carbon atoms per radical and vinyl, and Ar is selected from the group consisting of benzene, naphthalene, biphenyl and phenanthrene.

17. A prepreg fibrous reinforced plastic composition comprising reinforcing fibers impregnated with graft polymer prepared from a resinifiable mix comprising an inert solvent solution containing between about 30 and about 60 wt. percent of a monovinyl crosslinking agent, between about 0.5 and about 20 wt. percent of an aryl monomer containing at least two vinyl groups attached to the aryl nucleus, between about 0.5 and about 5.0 wt. percent of a free radical organic peroxide catalyst, and the balance of said mix being a normally liquid polymer of a $C_4$ to $C_6$ conjugated diolefin and heating the said mix at a temperature between about 200 and about 300° F. for between about 320 and about 15 minutes to form said graft polymer, air drying said impregnated reinforcing fibers at from room temperature to 325° F. to form a prepreg fibrous reinforced plastic composition.

18. A prepreg fibrous reinforced plastic composition as in claim 17 wherein the normally liquid polymer of the resinifiable mix is selected from the group consisting of the homopolymer of polybutadiene and the copolymer of butadiene with styrene.

19. A prepreg fibrous reinforced plastic composition as in claim 17 wherein the aryl monomer of the resinifiable mix is a vinyl compound having the formula

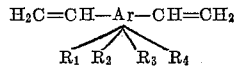

wherein $R_1$, $R_2$, $R_3$, and $R_4$ are selected from the group consisting of hydrogen, halogen, alkyl containing up to four carbon atoms per radical and vinyl, and Ar is selected from the group consisting of benzene, naphthalene, biphenyl and phenanthrene.

References Cited in the file of this patent

UNITED STATES PATENTS

| | | |
|---|---|---|
| 2,564,695 | Johnson et al. | Aug. 21, 1951 |
| 2,656,873 | Stephens | Oct. 27, 1953 |
| 2,892,972 | Ross | June 30, 1959 |
| 2,901,448 | Kraus | Aug. 25, 1959 |
| 2,981,650 | Bader et al. | Apr. 25, 1961 |

FOREIGN PATENTS

| | | |
|---|---|---|
| 767,642 | Great Britain | Feb. 6, 1957 |